United States Patent
Nyamwange et al.

(10) Patent No.: US 12,125,353 B1
(45) Date of Patent: Oct. 22, 2024

(54) AUTOMATED TELLER MACHINE (ATM) NETWORKS WITH A REAL TIME DIGITAL TWIN ECOSYSTEM FOR MULTI-REGION OR WIRED WIDE AREA NETWORKS (WAN) IN ORDER TO PREDICT FAILURES/FAULTS

(71) Applicant: Bank of America Corporation, Charlotte, NC (US)

(72) Inventors: Elvis Nyamwange, Little Elm, TX (US); Erik Dahl, Newark, DE (US); Brian Jacobson, Los Angeles, CA (US); Pratap Dande, St. Johns, FL (US); Hari Vuppala, Charlotte, NC (US); Rahul Yaksh, Austin, TX (US); Rahul Phadnis, Charlotte, NC (US); Amer Ali, Jersey City, NJ (US); Sailesh Vezzu, Hillsborough, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/222,537

(22) Filed: Jul. 17, 2023

(51) Int. Cl.
G07F 19/00 (2006.01)
(52) U.S. Cl.
CPC .......... *G07F 19/209* (2013.01); *G07F 19/206* (2013.01); *G07F 19/207* (2013.01)
(58) Field of Classification Search
CPC ..... G07F 19/209; G07F 19/206; G07F 19/207
See application file for complete search history.

(56) References Cited

U.S. PATENT DOCUMENTS

| | | | |
|---|---|---|---|
| 11,429,725 B1* | 8/2022 | Banerjee | G06Q 20/1085 |
| 2009/0201372 A1* | 8/2009 | O'Doherty | G07F 19/207 |
| | | | 348/150 |
| 2022/0321592 A1* | 10/2022 | Singh | G07F 19/207 |
| 2024/0071184 A1* | 2/2024 | Serna | G07F 19/209 |

* cited by examiner

*Primary Examiner* — Sonji N Johnson
(74) *Attorney, Agent, or Firm* — Weiss & Arons LLP (57) ABSTRACT

A computer performs a method for pro-actively administering a physical network of automated teller machines (ATM). The network may include ATMs. The network may be coupled, using an asynchronous transfer mode Wide Area Network (WAN) and the router, to a second plurality of ATMs via a digital subscriber line (DSL) module, a Closed Circuit Television (CCTV) system to provide CCTV television footage, and/or a 5-G cellular interface. The method receives input data using a data processing block coupled to the network of ATMs. The data may be derived from the plurality of ATMS, the WAN, the second plurality of ATMs, the CCTV and/or the 5-G cellular network interface. The method cleans and processes data and leverages a virtual digital twin to predictively provide status information of the ATMs based on the data. The method may formulate and maintain predictive data using a digital twin prediction model.

21 Claims, 5 Drawing Sheets

AUTOMATED TELLER MACHINE (ATM) NETWORKS WITH A REAL TIME DIGITAL TWIN ECOSYSTEM FOR MULTI-REGION OR WIRED WIDE AREA NETWORKS (WAN) IN ORDER TO PREDICT FAILURES/FAULTS

FIELD OF TECHNOLOGY

Aspects of the disclosure relate to automated teller machine (ATM) networks.

BACKGROUND OF THE DISCLOSURE

There are many shortcomings to deploying an abundance of monitoring tools to check on the health of ATMs. This is especially true when the ATMs are deployed in different regions.

Nevertheless, failures caused by unnoticed events at ATMs which require engineers to triage the issues causes downtime. This hinders the operation of ATMs for users and risks dissatisfaction.

It would be desirable to leverage one or more digital twins for use with an ATM network, such that the digital twins are equipped with machine learning capabilities to accurately forecast system failures of the ATM network. It would be further desirable to use a digital twin for forecasting future system failures of the ATM network prior to their occurrences.

SUMMARY OF THE DISCLOSURE

A method for pro-actively administering a network of automated teller machines (ATM) is provided. The network includes a plurality of ATMs.

The method may include communicatively coupling, using a router, the network to each of the plurality of ATMs. The method may also include coupling the network, using an asynchronous transfer mode Wide Area Network (WAN) and the router, to a second plurality of ATMs via a digital subscriber line (DSL) module. In addition, the method may include coupling a Closed Circuit Television (CCTV) system to the router to provide CCTV television footage and coupling, using a 5-G cellular interface, the router to the cloud via the Internet.

The method may include receiving input data using a data processing block coupled to the network of ATMs, whereby the input data is being generated by the network of ATMs. The data is also preferably derived, via the router, from the plurality of ATMS, the WAN, the second plurality of ATMs, the CCTV and the 5-G cellular network interface.

The method may include cleaning and processing the data to output cleaned and processed data, and leveraging a virtual digital twin to predictively provide status information of the network of ATMs. The leveraging may include receiving the cleaned and processed data to formulate and maintain predictive data.

The method may utilize a digital twin prediction model for receiving the predictive data in order to formulate and maintain a digital twin predictive model. The virtual digital twin model may preferably be adapted for producing predictive analysis of the network of ATMs.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

In banking and ATM availability, there is a demand for highly reliable networks and networks that are easy to monitor. Such monitoring preferably includes the detection of faults in real-time or near real-time with minimal manual intervention. With the introduction of the high-speed 5G network, an agile and relatively fast detection system or, conversely, a network outage, can significantly impact ATM services and impact business processes.

System and methods according to the disclosure include a digital twin of an ATM network. The digital twin may include a neural network that maps on a physical model. The physical model may include data obtained from ATMs in given region. These ATMs preferably form the network of ATMs or may be selected therefrom.

The data may be derived from a network, ATM machines, Global Navigation Satellite System (GNSS) for location services, a control platform, 5G Operator, close circuit television (CCTV), cellular router with 5G connectivity, WAN connection, or similar data source. A digital twin dataset according to the disclosure may include network connectivity data derived from the physical model in the real world.

One embodiment of the WAN connection, or one or more of the other data sources, includes an asynchronous transfer mode. An asynchronous transfer mode is a transfer mode for switching and transmission that efficiently and flexibly organizes information into cells. It is asynchronous to the extent that the recurrence of cells depends on the required or instantaneous bit rate. Thus, empty cells do not go by when data is waiting. Such a mode provides flexibility because it is a high-capacity, low-latency switching fabric for substantially all types of information. Such information may include data, video, image and voice, which is protocol-, speed- and distance-independent.

Also, some embodiments of the disclosure may store the data model and prediction results on a dedicated digital twin (DT) database.

Certain embodiments may also contain the virtual model; which is exactly a replica model based on the physical model of the ATM network devices and components. The embodiments preferably provide a DT-based prediction model in which the machine learning (ML) model receives the input data from, and operates alongside, ATM network.

Embodiments of a system according to the disclosure may contain a communication unit. This communications unit may provide information on the events of network data input. Such events may include high bandwidth consumption, seasonal outages, weather and temperature abnormalities, population dislocations such as in the case of extreme weather events.

The virtual network model, which may form a part of a neural network leveraged by the DT, preferably orchestrates the DT process in conjunction with the ML model. The DT process may be configured to map a physical process and may include a specific flow of data regarding the operation of the physical process.

ML may be responsible for processing the detailed components of the DT process. The ML may include equations necessary for calculations, The real and virtual models were preferably configured similarly. The DT network process is predicted using the digital twin prediction model and the results are pushed to the database. Then, a REST API is used to send the prediction to the DT communication service layer.

Certain ML models according to the embodiments may involve the following systems and methods. One or more ML models may be created by training the ML with all input data features of an ATM connection and related ATM networking features. This ML preferably includes GPS positions and information, CCTV camera connectivity, router health status for positive and negative events, high speed connection and cellular network status for a relevant 5G router, 5G operator connectivity status, ATM/ATM components/networking components good health status and/or ATM/ATM components/networking components critical status. The trained model may be used to predict network connectivity of all ATMs in a designated region or regions and pooled together for easy root cause identification prior to fault occurrences.

The DT-based prediction model can preferably predict the network failures proactively before they occur. In addition, machine learning models according to the embodiments are preferably trained based on different regions and status for the database health and events. The information from the different regions can be used to fill out the information for other regions and, thereby, information can be bootstrapped across various regions in such a way as to intensify the analysis and improve prediction of outages. Further, regions can be pooled together to help identify the location of the ATMs and networks.

In some of the embodiments, both wired and 5G networks can be monitored with reference to the status of potential failures, and these failures can be predicted before they occur.

Because a digital twin is used to monitor the physical ATM network and all the devices running ATMs, the production environment is isolated from any decision-making or other information provided by the digital twin. As such, there will be at least one degree of separation between the digital twin and the production environment. This will safeguard any mistakes during the learning process from directly affecting operations.

A network of automated teller machines (ATM) is provided. The network includes a plurality of ATMs. The network also includes a router communicatively coupled to each of the plurality of ATMs. The network may also include an asynchronous transfer mode Wide Area Network (WAN) coupled to a second plurality of ATMs via a digital subscriber line (DSL) module. The WAN coupled to the router. A Closed Circuit Television (CCTV) system coupled to the router. A 5-G cellular interface may also be coupled to the router and coupled to the cloud via the Internet.

The network may include a data processing block coupled to the network of ATMs. The data processing block receives input data from the network of ATMs. The data is derived, via the router, from the plurality of ATMS, the WAN, the second plurality of ATMs, the CCTV and/or the 5-G cellular network interface. The data processing block is further configured to output cleaned and processed data.

The network may also include a virtual digital twin. The virtual digital twin may include a machine learning (ML) model. The ML model is preferably coupled to receive the cleaned and processed data and to use the cleaned and processed data as model training data and feedback data in order to formulate and maintain predictive data.

The digital twin prediction model may receive the predictive data to formulate and maintain a digital twin predictive model. The virtual digital twin model may be adapted for producing predictive analysis of the network of ATMs.

The data processing block may also include a data cleaning and processing block. The data cleaning and processing block may be coupled to receive input data from the network of ATMs. The data processing block may also include a dataset. The dataset may be coupled to receive cleaned and processed data from the data cleaning and processing block. The dataset may be further configured to store the cleaned and processed data and to transmit the cleaned and processed data to the ML model as cleaned and processed data.

The digital twin prediction model may be configured to formulate and leverage a virtual digital twin model of the network of ATMs, The network may also include a prediction data database. Such a database may be further configured to receive the predictive analysis of the network of ATMs.

The network may include a communication service. The communication service may be for providing, on-demand, selected information from the predictive analysis to a user for display. The communication service may prompt the user for action regarding the selected information.

The network may also include a cloud connection. The cloud connection may be used for coupling the internet and the cloud.

The following figures and associated written specifications set forth the invention in additional detail to the foregoing.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
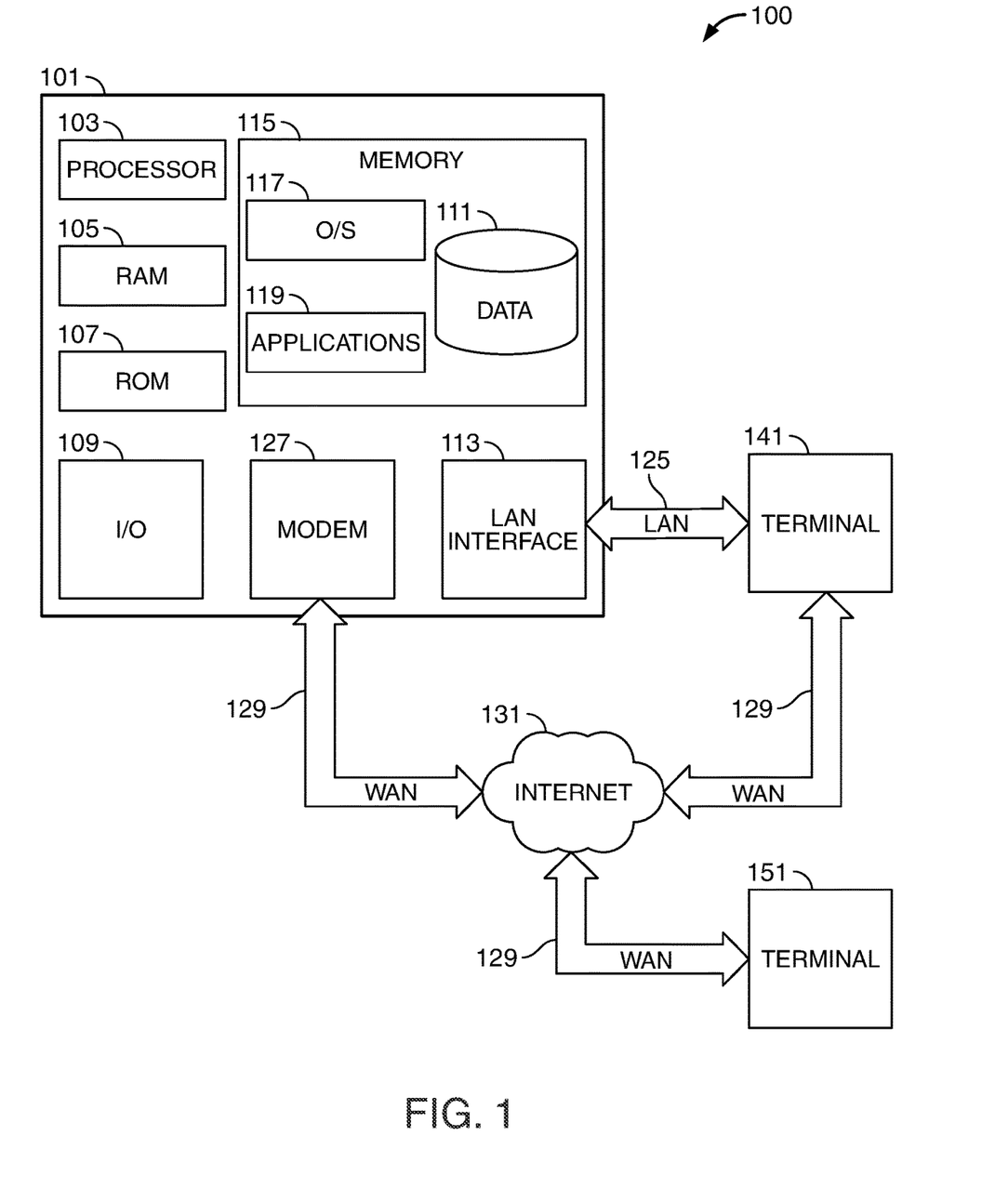
FIG. 1 shows an illustrative system in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
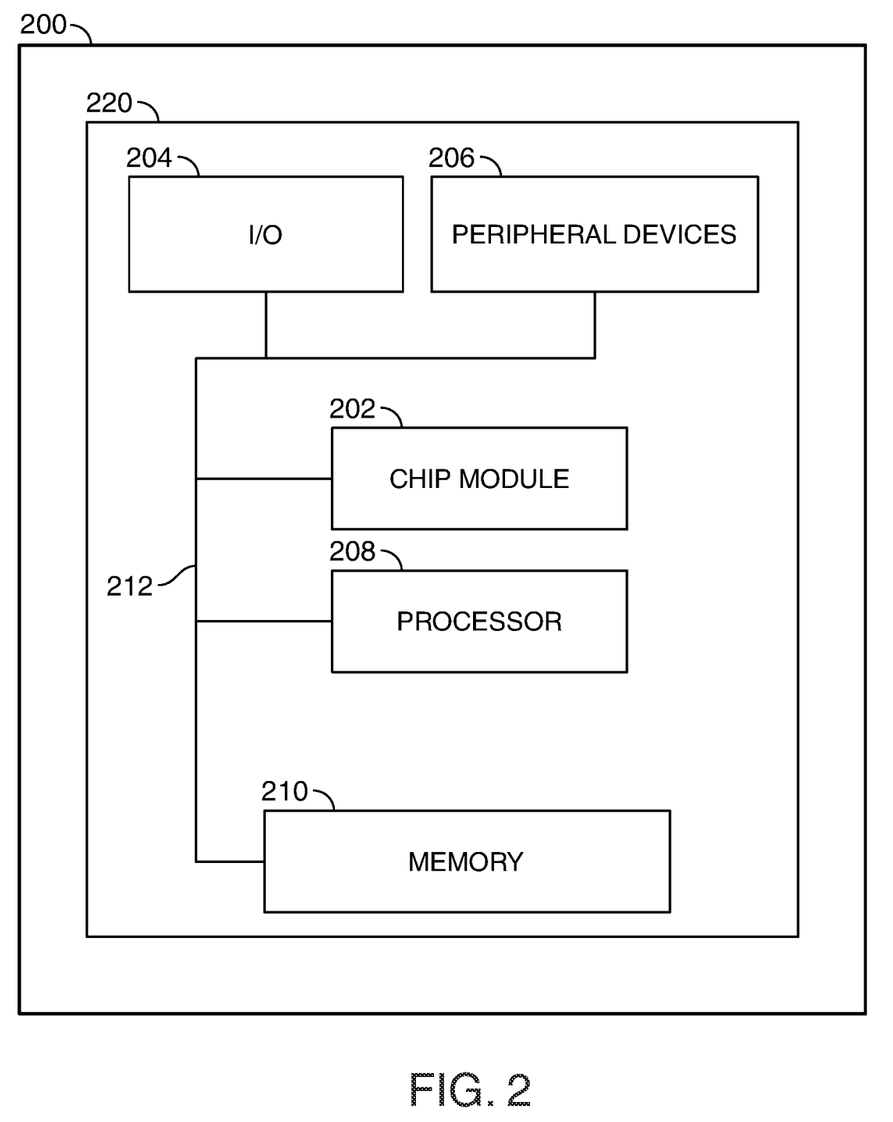
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
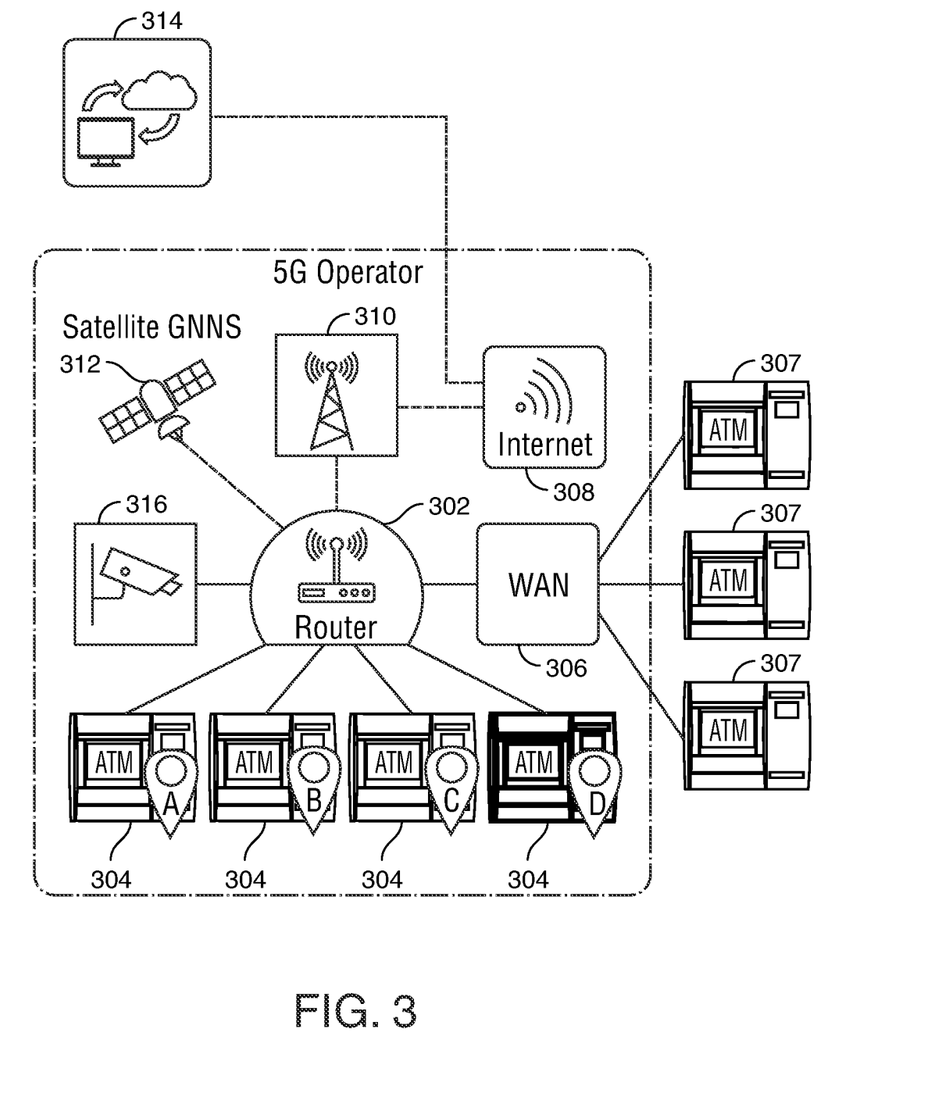
FIG. 3 shows an illustrative schematic diagram in accordance with the principles of the disclosure.

FIG. 3 shows an illustrative schematic diagram in accordance with the principles of the disclosure. At 302 a router is shown.

Router 302 is preferably adapted for electronic communication with one or more various data sources. Such data sources may include a plurality of ATMs 304. Information may be drawn from the plurality of ATMs 304 which includes operational information, fault information, location information, on-site weather information, current ATM status information, ATM peripherals information, associated financial center information, on-site or related infrastructure information or any other suitable information. This information may be used in the formation of the digital twin model, and maintenance of said model, according to the embodiments of the disclosure.

Data sources may also include a Wide Area Network (WAN) which itself may be electronically communicatively coupled using, for example, a digital subscriber line (see 608 in FIG. 6) to a second plurality of ATMs 307.

Another source for data may include a 5G operator 310 which, in turn may be coupled to the Internet 308 which in turn may be coupled to the cloud 314 to draw third party, or other suitable, information. Such information may include weather information, event information and/or any other suitable information for use with the router according to the embodiments.

Yet another source for information may be from satellite information such as the Global Navigation Satellite System (GNSS) 312. This information may include information about the ATMs in a pre-determined region. In fact, many of the data sources may provide regional information—i.e., information that may be drawn to a specific, preferably pre-determined, region.

At 314, a closed circuit television (CCTV) is shown as communicatively coupled to router 302. It should be noted that a CCTV 314 may be able to provide data from an individual ATM location, or bank of ATMs, for use with constructing the digital twin.

Figure 4:
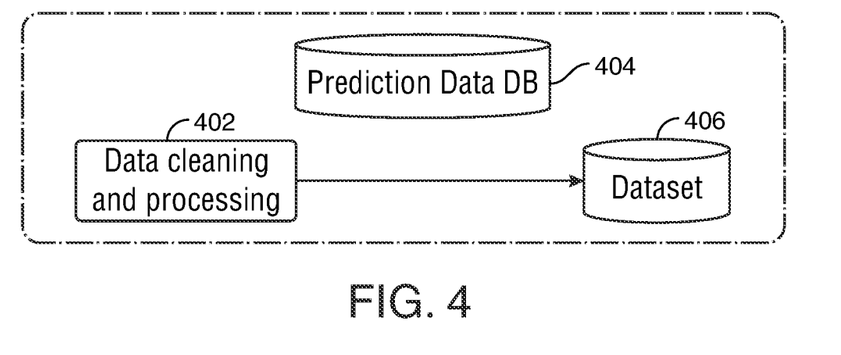
FIG. 4 shows another schematic diagram in accordance with principles of the disclosure.

FIG. 4 shows another schematic diagram in accordance with principles of the disclosure. At 402, a data cleaning and processing step is shown. This step may indicate that the raw data is received and processed from the data sources, via router 302, shown in FIG. 3, and then formed into a relevant dataset, as shown at 406. Dataset may be used to provide the cleaned and processed data for use with the machine learning model in the digital twin. This cleaned and processed data may be used to formulate modeling data and/or for maintaining, or helping to maintain, the efficacy of the machine learning model over time.

Figure 5:
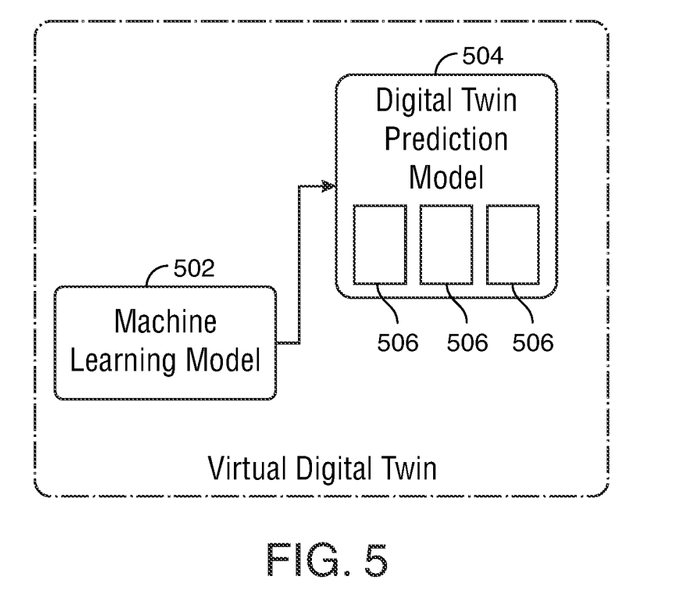
FIG. 5 shows yet another schematic diagram in accordance with principles of the disclosure.

FIG. 5 shows yet another schematic diagram in accordance with principles of the disclosure. At 502, the virtual digital twin is shown as including the machine learning model. At 504, the digital twin prediction model 504 is shown. Digital twin prediction model 504 preferably includes numerous virtual ATMs 506. As shown in FIG. 5, the cleaned and processed information may be used by machine learning model 502 to feed digital twin prediction model 504 such that digital twin prediction model 504 can preferably create twin ATMs 506. Digital twin prediction model 504 may preferably leverage twin ATMs 506 to predict the future operational condition of twin ATMs. Then digital twin prediction model 504 may then use the predicted future operational condition of twin ATMs 506 to treat, and/or mitigate, the occurrence of future fault conditions.

Figure 6:
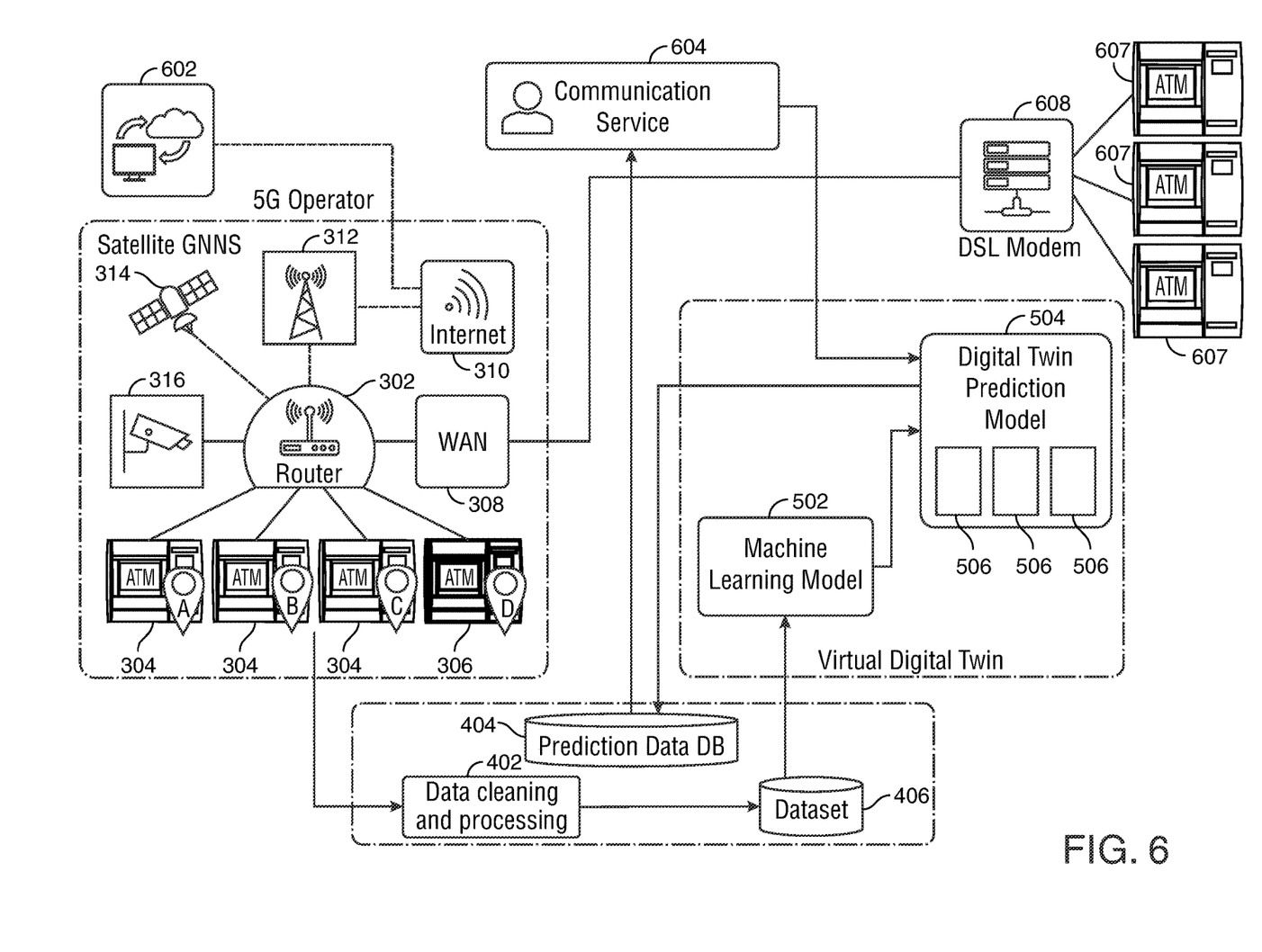
FIG. 6 a hybrid flow diagram in accordance with principles of the disclosure.

FIG. 6 a hybrid flow diagram in accordance with principles of the disclosure. In fact, FIG. 6 is an amalgamation of the systems shown in FIGS. 3-5. As such, the element numbers 302-316, 402-406, and 502-506 all correspond to similar elements as shown in FIGS. 3-5.

Furthermore, FIG. 6 also includes a schematic diagram of a cloud connection at 602, a communication service layer at 604 (the communication service for receiving prediction data from prediction data database (DB) 404 and providing, preferably on-demand, selected information from the predictive analysis to a user for display and prompting said user for action regarding the selected information), and a DSL modem 608 (coupled to a second plurality of ATMs 607).

Thus, methods and apparatus provide automated teller machine (ATM) networks with a real time digital twin ecosystem for multi-region or wired wide area networks (WAN) in order to predict failures/faults in order to predict failures/faults and mitigate same. Persons skilled in the art will appreciate that the present invention can be practiced by other than the described embodiments, which are presented for purposes of illustration rather than of limitation, and that the present invention is limited only by the claims that follow.

What is claimed is:

1. A network of automated teller machines (ATM), the network comprising a plurality of ATMs, the network comprising;
   a router communicatively coupled to each of the plurality of ATMs,
   an asynchronous transfer mode Wide Area Network (WAN) coupled to a second plurality of ATMs via a digital subscriber line (DSL) module, the WAN coupled to the router;
   a Closed Circuit Television (CCTV) system coupled to the router;
   a 5-G cellular interface, coupled to the router and coupled to a cloud computing environment via an Internet;
   a data processing block coupled to the network of ATMs; said data processing block for receiving input data from the network of ATMs, the data being derived, via the router, from the plurality of ATMS, the WAN, the second plurality of ATMs, the CCTV and a 5-G cellular network interface, the data processing block further configured to output cleaned and processed data; and
   a virtual digital twin model comprising:
      a machine learning (ML) model, said ML model coupled to receive the cleaned and processed data and to use the cleaned and processed data as model training data and feedback data in order to formulate and maintain predictive data; and
      a digital twin prediction model operable to produce, using the predictive data, a predictive analysis of the network of ATMs.

2. The network of claim 1, wherein the data processing block further comprises a data cleaning and processing block, the data cleaning and processing block coupled to receive input data from the network of ATMs.

3. The network of claim 2, wherein the data processing block further comprises a dataset, the dataset coupled to receive cleaned and processed data from the data cleaning and processing block, and the dataset further configured to store the cleaned and processed data and to transmit the cleaned and processed data to the ML model as cleaned and processed data.

4. The network of claim 1, wherein the digital twin prediction model is configured to formulate and leverage said virtual digital twin model of the network of ATMs.

5. The network of claim 1, further comprising a prediction data database, said prediction data database further configured to receive the predictive analysis of the network of ATMs.

6. The network of claim 5, further comprising a communication service, said communication service for providing, on-demand, selected information from the predictive analysis to a user for display and prompting said user for action regarding the selected information.

7. The network of claim 1 further comprising a cloud connection, said cloud connection for coupling the internet and the cloud.

8. A method for pro-actively administering a network of automated teller machines (ATM), the network comprising a plurality of ATMs, the method comprising;
   communicatively coupling, using a router, the network to each of the plurality of ATMs,
   coupling the network, using an asynchronous transfer mode Wide Area Network (WAN) and the router, to a second plurality of ATMs via a digital subscriber line (DSL) module;
   coupling a Closed Circuit Television (CCTV) system to the router to provide CCTV television footage;
   coupling, using a 5-G cellular interface, the router to a cloud computing environment via an Internet,
   receiving input data using a data processing block coupled to the network of ATMs, the input data being generated by the network of ATMs, the data being derived, via the router, from the plurality of ATMS, the WAN, the second plurality of ATMs, the CCTV and a 5-G cellular network interface, and cleaning and processing the data to output cleaned and processed data; and
   leveraging a virtual digital twin model to predictively provide status information of the network of ATMs, the leveraging comprising receiving the cleaned and processed data to formulate and maintain predictive data;
   receiving, using a digital twin prediction model, said predictive data to formulate and maintain the digital twin predictive model, said virtual digital twin model operable to produce a predictive analysis of the network of ATMs.

9. The method of claim 8, wherein the data processing block further comprises a data cleaning and processing block, the data cleaning and processing block for receiving input data from the network of ATMs.

10. The method of claim 9, wherein the data processing block further comprises a dataset, the dataset coupled for receiving cleaned and processed data from the data cleaning and processing block, storing the cleaned and processed data and transmitting the cleaned and processed data to the digital twin predictive model as cleaned and processed data.

11. The method of claim 8, further comprising using the digital twin prediction model to provide the virtual digital twin model of the network of ATMs.

12. The method of claim 8, further comprising receiving, using a prediction data database, the predictive analysis of the network of ATMs.

13. The network of claim 12, further comprising using a communication service, said communication service for providing, on-demand, selected information from the predictive analysis to a user, to display the selected information and to prompt the user to take action regarding same.

14. The method of claim 8 wherein the network of ATMs further comprises a cloud connection, said cloud connection for coupling the internet and the cloud.

15. A non-transitory computer-readable memory storing computer-executable instructions that, when executed by a processor on a computer, cause the computer to perform a method for pro-actively administering a physical network of automated teller machines (ATM), the physical network comprising a plurality of ATMs, the method comprising;
   communicatively coupling, using a router, the network to each of the plurality of ATMs;
   coupling the network, using an asynchronous transfer mode Wide Area Network (WAN) and the router, to a second plurality of ATMs via a digital subscriber line (DSL) module;
   coupling a Closed Circuit Television (CCTV) system to the router to provide CCTV television footage;
   coupling, using a 5-G cellular interface, the router to a cloud computing environment via an Internet,
   receiving input data using a data processing block coupled to the network of ATMs, the input data being generated by the network of ATMs, the data being derived, via the router, from the plurality of ATMS, the WAN, the second plurality of ATMs, the CCTV and a 5-G cellular network interface, and cleaning and processing the data to output cleaned and processed data;

leveraging a virtual digital twin model to predictively provide status information of the network of ATMs, the leveraging comprising:
receiving the cleaned and processed data to formulate and maintain predictive data; and
operating, using the predictive data, a digital twin prediction model to produce a predictive analysis of the network of ATMs.

16. The method of claim 15, wherein the data processing block further comprises a data cleaning and processing block, the data cleaning and processing block for receiving input data from the network of ATMs.

17. The method of claim 16, wherein the data processing block further comprises a dataset, the dataset coupled for receiving cleaned and processed data from the data cleaning and processing block, storing the cleaned and processed data and transmitting the cleaned and processed data to the digital twin predictive model as cleaned and processed data.

18. The method of claim 15, further comprising using the digital twin prediction model to provide the virtual digital twin model of the network of ATMs.

19. The method of claim 15, further comprising receiving, using a prediction data database, the predictive analysis of the network of ATMs.

20. The method of claim 19, further comprising using a communication service, said communication service for providing, on-demand, selected information from the predictive analysis to a user, to display the selected information and to prompt the user to take action regarding same.

21. The method of claim 15 wherein the network of ATMs further comprises a cloud connection, said cloud connection for coupling the internet and the cloud.

* * * * *